(No Model.)

C. P. ORNE.
GALVANIC BATTERY POROUS CUP.

No. 311,516. Patented Feb. 3, 1885.

Witnesses
S. N. Piper
C. R. Pratt

Inventor,
Charles Parker Orne
by R. H. Eddy atty

UNITED STATES PATENT OFFICE.

CHARLES PARKER ORNE, OF CAMBRIDGE, MASSACHUSETTS.

GALVANIC-BATTERY POROUS CUP.

SPECIFICATION forming part of Letters Patent No. 311,516, dated February 3, 1885.

Application filed June 23, 1884. (No model.)

*To all whom it may concern:*

Be it known that I, CHARLES PARKER ORNE, of Cambridge, in the county of Middlesex, of the Commonwealth of Massachusetts, have invented a new and useful Improvement in Galvanic-Battery Porous Cups; and I do hereby declare the same to be described in the following specification and represented in the accompanying drawings, of which—

Figure 1:
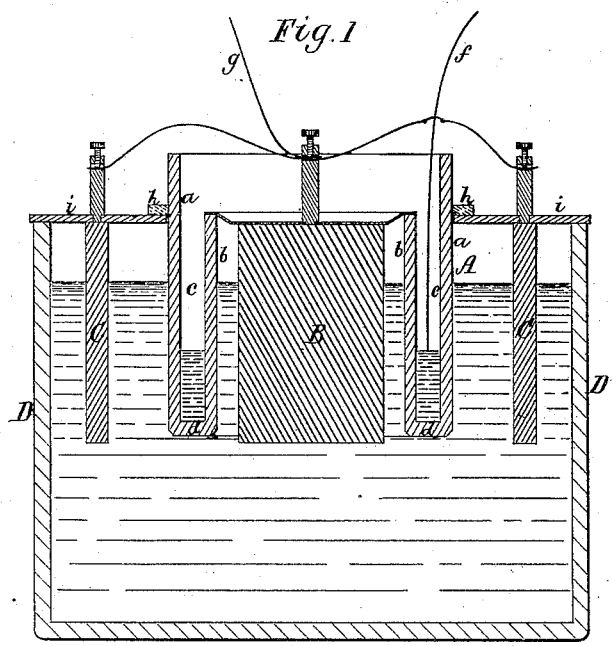
Figure 2:
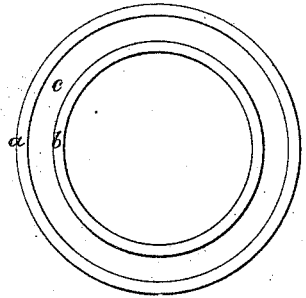
Figure 3:
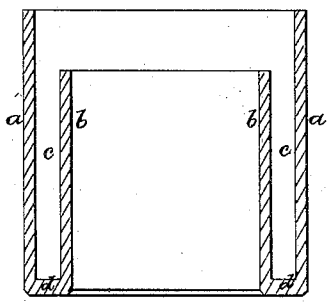

Figure 1 is a vertical section of a battery provided with my invention, the nature of which is defined in the claims hereinafter presented. Fig. 2 is a top view, and Fig. 3 a transverse section, of the porous cell of such battery.

The cell is composed of two tubes, $a$ and $b$, differing in their sizes or diameters and arranged one within the other with an annular space, $c$, between them, and both connected at their lower ends by an annular bottom, $d$, extending from one to the other of them, the inner tube being open at each end, and the said tubes and bottom being made of clay or other suitable material baked or reduced to a solid and more or less porous state, such material being of the kind usually employed in the manufacture of the ordinary porous cells for galvanic batteries. In Fig 1 such an annular cell is shown at A as having extended down within its internal part, $b$, a mass or cylinder, B, of carbon, and outside of it two masses or a tubular mass, C, of carbon, the whole being arranged within a glass tank, D, containing an exciting solution—such, for instance, as one part, by weight, of bichromate of potash; three parts, by weight, of sulphuric acid, and seven parts, by weight, of water.

Within the space $c$ of the cell is to be placed an amalgam of mercury and zinc, or a quantity of mercury and one or more plates or masses of zinc, from which one circuit-wire, $f$, of the battery is to extend, the other one, $g$, being connected with the carbons. The inner tubular part of the cell may extend as high as the outer one; but I prefer to have it of a less altitude, as represented, as in such case I am enabled to use on the outer tubular part an elastic rubber ring, $h$, to clasp it above the inner tubular part, and to support the cell by resting on the cover $i$ of the tank of the battery, in which case the entire space $c$ of the cell may be within the tank.

The great advantage of my improved cell over a simple tube closed at one end, as cells are usually made, is that the amalgam surface exposed to the action of the acid solution is greatly increased by it, as the solution is in contact with the inner as well as the outer curved surface of the cell.

With a galvanic battery constructed as described, chemical action of the acid solution on the amalgam ceases when the battery is not in use or the circuit is broken. Chemical action for the production of electricity takes place only when the circuit is closed, the mercury operating to prevent such action on the circuit being broken, the action when the circuit is closed being greatly increased, or very much greater, by means of the duplex tubular cell than with the ordinary pot-cell.

I herein make no claim to a battery constructed as represented in the United States Patent No. 283,355, dated July 17, 1883, and granted to me, as in such a battery there was no carbon arranged within the cell, as is the case in my present battery.

I therefore claim—

1. The galvanic-battery porous cup substantially as described, composed of the two porous tubes concentric with each other and an annular space between them, and provided with an annular bottom connecting them at their lower ends, the inner tube being open at the lower part of its bore, and all being essentially as represented.

2. A galvanic battery composed of a tank, D, an acid solution therein, a porous cell consisting of two concentric tubes united at their lower ends by a bottoming, a charge of amalgam or mercury and zinc placed within the holding-space of the cell, and a mass of carbon extended down within the internal tube of the cell, all being substantially as set forth, and one or more other masses of carbon in the tank and outside of the cell, as represented.

CHARLES PARKER ORNE.

Witnesses:
R. H. EDDY,
E. B. PRATT.